US008375310B2

(12) United States Patent
Hamilton, II et al.

(10) Patent No.: US 8,375,310 B2
(45) Date of Patent: Feb. 12, 2013

(54) PROVIDING NOTIFICATION OF A REAL-WORLD EVENT TO A VIRTUAL UNIVERSE USER

(75) Inventors: Rick A. Hamilton, II, Charlottesville, VA (US); Brian M. O'Connell, Cary, NC (US); Clifford A. Pickover, Yorktown Heights, NY (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 669 days.

(21) Appl. No.: 12/122,438

(22) Filed: May 16, 2008

(65) Prior Publication Data

US 2009/0287640 A1  Nov. 19, 2009

(51) Int. Cl.
G06F 3/048 (2006.01)
(52) U.S. Cl. ........ 715/757; 715/706; 715/771; 715/775; 715/782; 715/848
(58) Field of Classification Search ................. 715/200, 715/201, 273, 275, 700, 706, 733, 757, 760, 715/764, 771.775, 782, 848–852, 866
See application file for complete search history.

(56) References Cited

U.S. PATENT DOCUMENTS

| 7,036,082 | B1 * | 4/2006 | Dalrymple et al. | 715/757 |
|---|---|---|---|---|
| 7,058,897 | B2 * | 6/2006 | Matsuda | 715/758 |
| 7,743,330 | B1 * | 6/2010 | Hendricks et al. | 715/723 |
| 2002/0090985 | A1 * | 7/2002 | Tochner et al. | 463/1 |
| 2003/0097485 | A1 * | 5/2003 | Horvitz et al. | 709/313 |
| 2003/0217109 | A1 * | 11/2003 | Ordille et al. | 709/206 |
| 2004/0002958 | A1 * | 1/2004 | Seshadri et al. | 707/3 |
| 2004/0266505 | A1 * | 12/2004 | Keam et al. | 463/1 |
| 2006/0178968 | A1 * | 8/2006 | Jung et al. | 705/35 |
| 2007/0130001 | A1 * | 6/2007 | Jung et al. | 705/14 |
| 2007/0143119 | A1 * | 6/2007 | Jung et al. | 705/1 |
| 2007/0238520 | A1 * | 10/2007 | Kacmarcik | 463/33 |
| 2007/0265091 | A1 * | 11/2007 | Aguilar et al. | 463/42 |
| 2007/0268299 | A1 * | 11/2007 | Jung et al. | 345/581 |
| 2008/0004094 | A1 * | 1/2008 | Mueller et al. | 463/1 |
| 2008/0026804 | A1 * | 1/2008 | Baray et al. | 463/9 |
| 2008/0070691 | A1 * | 3/2008 | Hutchinson et al. | 463/42 |
| 2008/0104018 | A1 * | 5/2008 | Xia | 707/3 |
| 2008/0204450 | A1 * | 8/2008 | Dawson et al. | 345/419 |
| 2009/0164518 | A1 * | 6/2009 | Ghafoor | 707/104.1 |

OTHER PUBLICATIONS

Friedemann Mattern, Linking the Read World to the Virtual World, Jan. 2001, 38 pages.*
Gross, "It's My (Virtual) World . . . ", 3 pages, Nov. 3, 2006, retrieved from The New York Times Escapes at http://travel.nytimes.com/2006/11/03/travel/escapes/03second.html.

* cited by examiner

*Primary Examiner* — Ryan Pitaro
*Assistant Examiner* — Yongjia Pan
(74) *Attorney, Agent, or Firm* — William E. Schiesser; Hoffman Warnick LLC

(57) ABSTRACT

An approach that provides transmission and notification of a real-world event to a virtual universe user is described. In one embodiment, there is a method for notifying a resident that is on-line in a virtual universe of an occurrence of a real-world event. The method includes receiving an indication of the occurrence of the real-world event, mapping the indication of the real-world event into one of a plurality of communication representations, and notifying the resident in the virtual universe in accordance with the mapped communication representation.

18 Claims, 6 Drawing Sheets

PROVIDING NOTIFICATION OF A REAL-WORLD EVENT TO A VIRTUAL UNIVERSE USER

FIELD OF THE INVENTION

This invention relates generally to virtual universes, and more specifically to transmitting, representing and notifying real-world event data to residents that are on-line in a virtual universe.

BACKGROUND OF THE INVENTION

Virtual universes or virtual worlds are computer-based simulated environments intended for its residents to inhabit and interact via avatars, which are personas or representations of the residents of the virtual universes and generally take the form of two-dimensional or three-dimensional human or fantastical representations of a person's self. These types of virtual universes are now most common in massive multi-player on-line games, such as Second Life which is a trademark of Linden Research in the United States, other countries or both. Avatars in these types of virtual universes, which can number well over a million, have a wide range of business and social experiences.

Because many of these virtual universes have many activities and places to visit, residents are spending a great deal of time in these universes and many are finding that they are losing touch with the real-world. Currently, there are no approaches that enable residents to receive notifications of real-world events while on-line in the virtual universes.

SUMMARY OF THE INVENTION

In one embodiment, there is a method for notifying a resident that is on-line in a virtual universe of an occurrence of a real-world event. In this embodiment, the method comprises: receiving an indication of the occurrence of the real-world event; mapping the indication of the real-world event into one of a plurality of communication representations; and notifying the resident in the virtual universe in accordance with the mapped communication representation.

In a second embodiment, there is a computer system for notifying a resident that is on-line in a virtual universe of a real-world event. In this embodiment, the system comprises at least one processing unit and memory operably associated with the at least one processing unit. A real-world event notification tool is storable in memory and executable by the at least one processing unit. The tool comprises an event detection component configured to receive an indication of the real-world event. The tool further comprises a policy table that associates a plurality of real-world events to communication representations that are indicative of real-world events. An event interpreter component is configured to determine at least one communication representation from the policy table that corresponds with the real-world event indication received by the event detection component. An event notification component is configured to notify the resident in the virtual universe in accordance with the at least one communication representation determined by the event interpreter component.

In a third embodiment, there is a computer-readable medium storing computer instructions, which when executed, enables a computer system to notify a resident that is on-line in a virtual universe of a real-world event. In this embodiment, the computer instructions comprises receiving an indication of the real-world event; mapping the indication of the real-world event into one of a plurality of communication representations; and notifying the resident in the virtual universe in accordance with the mapped communication representation.

In a fourth embodiment, there is a method for deploying a real-world event notification tool for use in a computer system that notifies a resident that is on-line in a virtual universe of an occurrence of a real-world event. In this embodiment, a computer infrastructure is provided and is operable to receive an indication of the occurrence of the real-world event; map the indication of the real-world event into one of a plurality of communication representations; and notify the resident in the virtual universe in accordance with the mapped communication representation.

DETAILED DESCRIPTION OF THE INVENTION

Embodiments of this invention are directed to a technique for notifying residents that are on-line in a virtual universe of real-world events. Real-world events are detected by a real-world event notification tool that runs on a virtual universe client that enables residents to interact with the virtual universe through one of several different approaches. For example, the virtual universe client can detect real-world events by periodically receiving indications of the events through push or pull technologies used to extract such information or through periodic requests made by the client to receive the information. A policy table specifies various communication representations that correspond with real-world events. An event interpreter component associates a received indication of a real-world event to at least one of the communication representations. An event notification component notifies the residents that are on-line in the virtual universe of the real-world event in accordance with the representation specified by the policy table. Examples of possible forms of notification include providing residents with a teleport invitation that will bring the residents to a simulacrum of the real-world event within the virtual universe, placing the representation in an inventory of the resident that is associated with the virtual universe, changing the visual characteristics of the resident to a representation that is indicative of the real-world event and changing the visual characteristics of the landscape within the virtual universe to a representation that is indicative of the event.

Figure 1:
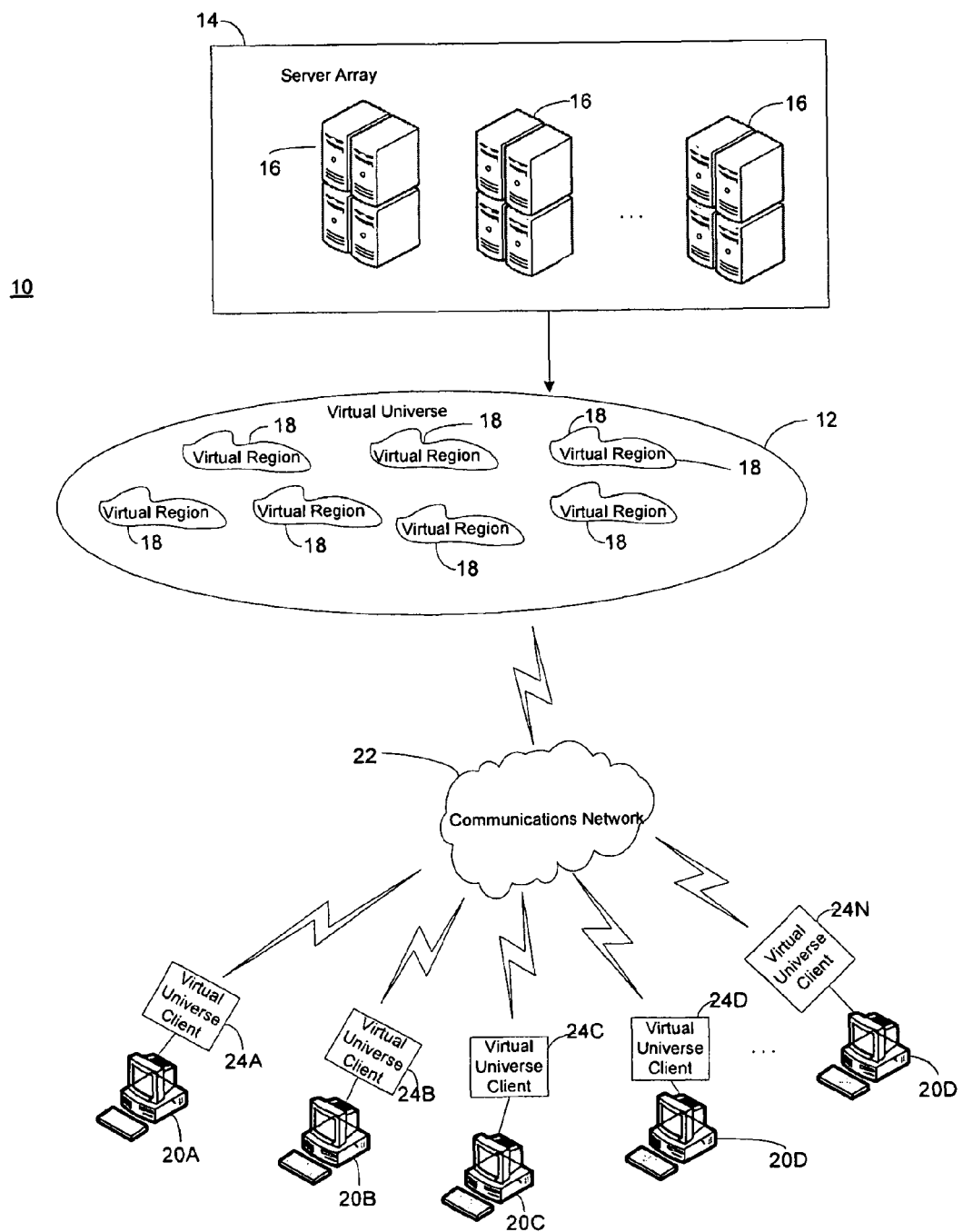
FIG. 1 shows a high-level schematic diagram showing a networking environment for providing a virtual universe according to one embodiment of this invention.

FIG. 1 shows a high-level schematic diagram showing a networking environment 10 for providing a virtual universe 12 according to one embodiment of this invention in which a tool for notifying residents of a virtual universe that are on-line of real-world event data can be utilized. As shown in FIG.

1, the networking environment 10 comprises a server array or grid 14 comprising a plurality of servers 16 each responsible for managing a portion of virtual real estate within the virtual universe 12. A virtual universe provided by a typical massive multiplayer on-line game can employ thousands of servers to manage all of the virtual real estate. The content of the virtual real estate that is managed by each of the servers 16 within the server array 14 shows up in the virtual universe 12 as a virtual region 18. Like the real-world, each virtual region 18 within the virtual universe 12 comprises a living landscape having things such as buildings, stores, clubs, sporting arenas, parks, beaches, cities and towns all created by residents of the universe that are represented by avatars. These examples of items are only illustrative of some things that may be found in a virtual region and are not limiting. Furthermore, the number of virtual regions 18 shown in FIG. 1 is only for illustration purposes and those skilled in the art will recognize that there may be many more regions found in a typical virtual universe. FIG. 1 also shows that users operating computers 20A-20N interact with the virtual universe 12 through a communication network 22 via virtual universe clients 24A-24A, respectively, that reside in the computer. Below are further details of the virtual universe 12, server array 14, and virtual universe client.

Figure 2:
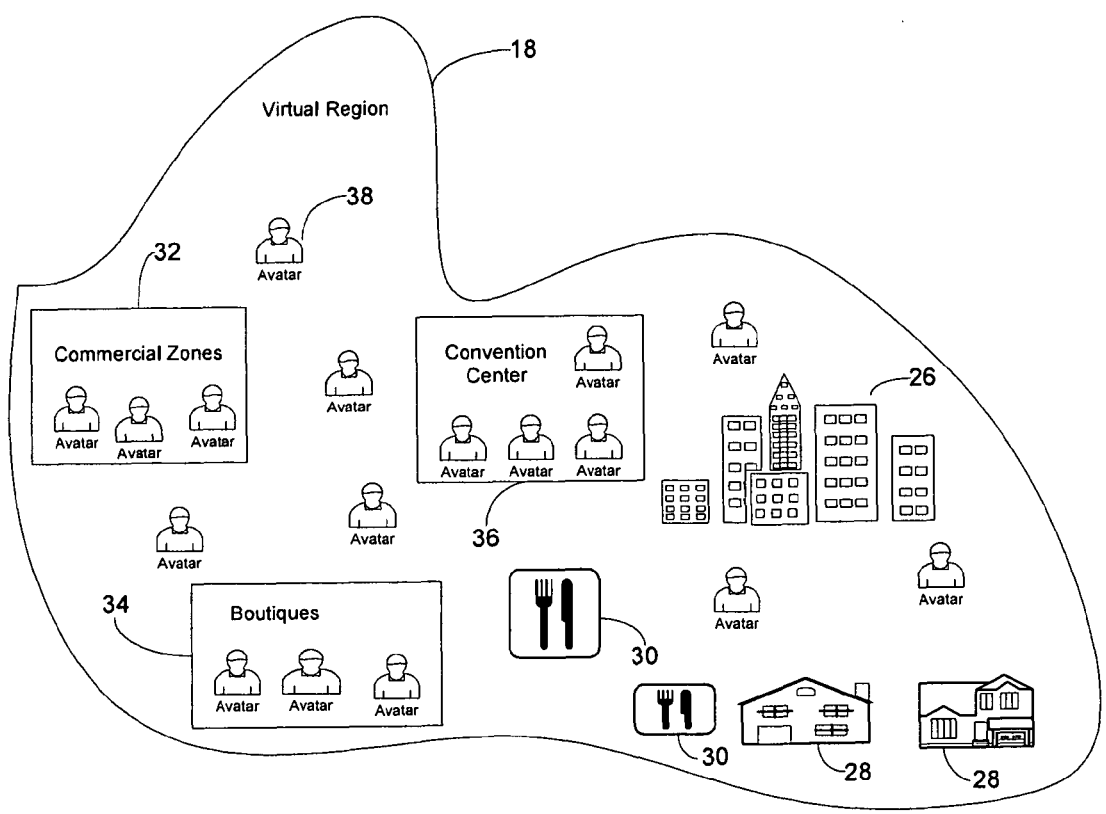
FIG. 2 shows a more detailed view of a virtual region shown in the virtual universe of FIG. 1.

FIG. 2 shows a more detailed view of a virtual region 18 shown in the virtual universe 12 of FIG. 1. As an example, the virtual region 18 shown in FIG. 2 comprises a downtown office center 26, homes 28, restaurants 30 commercial zones 32 and boutiques 34 for shopping and a convention center 36 for meetings and various conventions. Avatars 38, which as mentioned above, are personas or representations of the residents of the virtual universe, roam all about the virtual region by walking, driving, flying or even by teleportation or transportation which is essentially moving through space from one point to another, more or less instantaneously. These examples of items in the virtual region 18 shown in FIG. 2 are only illustrative of some things that may be found in a virtual region and those skilled in the art will recognize that these regions can have many more items that can be found in a real-life universe as well as things that do not presently exist in real life.

Figure 3:
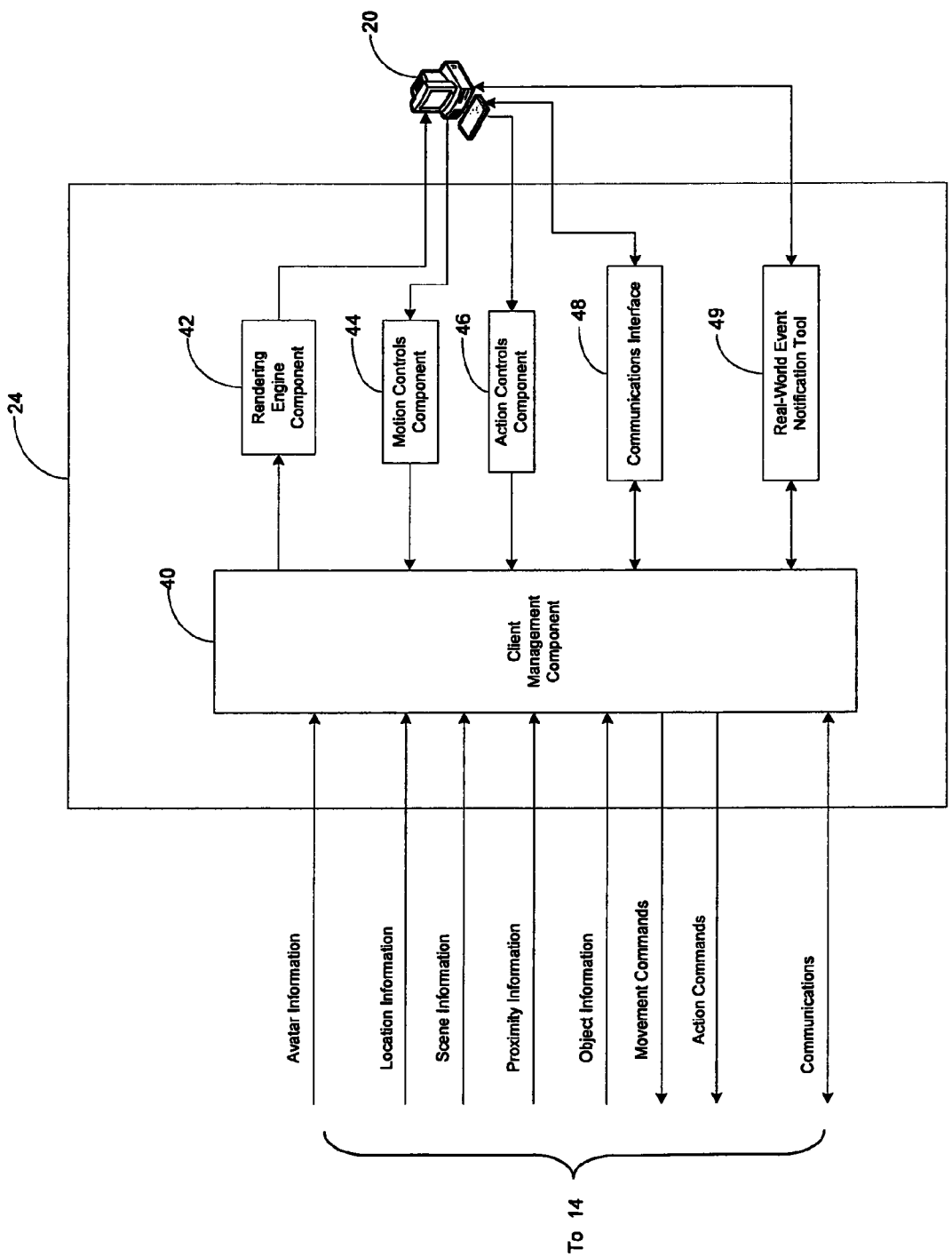
FIG. 3 shows a more detailed view of the virtual universe client shown in FIG. 1.

FIG. 3 shows a more detailed view of the virtual universe client shown in FIG. 1. The virtual universe client, which enables users to interact with the virtual universe 12, comprises a client management component 40, which manages actions, movements and communications made by a user through computer 20, and information received from the virtual universe through the server array 14. A rendering engine component 42 enables the user of the computer 20 to visualize his or her avatar within the surroundings of the particular region of the virtual universe 12 that it is presently located. A motion controls component 44 enables the user to make movements through the virtual universe. In one embodiment, movements through the virtual universe can include for example, gestures, postures, walking, running, driving, flying, etc.

An action controls component 46 enables the user to perform actions in the virtual universe such as buying items for his or her avatar or even for their real-life selves, building homes, planting gardens, etc., as well as changing the appearance of their avatar. These actions are only illustrative of some possible actions that a user can perform in the virtual universe and are not limiting of the many possible actions that can be performed. A communications interface 48 enables a user to communicate with other users of the virtual universe 12 through modalities such as chatting, instant messaging, gesturing, talking and email.

FIG. 3 shows various information that may be received by the client management component 40 from the virtual universe through the server array 14. In particular, the client management component 40 receives avatar information about the avatars that are in proximity to the user's avatar. In addition, the client management component 40 receives location information about the area that the user's avatar is near (e.g., what region or island he or she is in) as well as scene information (e.g., what the avatar sees). The client management component 40 also receives proximity information which contains information on what the user's avatar is near and object information which is information that can be obtained by one's senses (e.g., touch, taste, smell, etc.) and what actions are possible for nearby objects (e.g., postures, movements). FIG. 3 also shows the movement commands and action commands that are generated by the user that are sent to the server array via the client management component 40, as well as the communications that can be sent to the users of other avatars within the virtual universe.

FIG. 3 shows that the virtual universe client also includes a real-world event notification tool 49 that notifies residents that are on-line in a virtual universe of real-world events. As used herein, a real-world event is something that is happening or regarded as happening in the real-world that could be local or global to the resident. Examples of real-world events may include news reports of current events that are occurring in the real-world, weather reports, emergency notifications and events occurring at the resident's computer such as processor temperature indications, computer memory usage, central processing unit usage, detection of spyware or viruses, emails, instant messages, reminders, phone calls, etc. Those skilled in the art will recognize that these examples are non-exhaustive of the many possibilities of real-world events that can be brought to the attention of a resident.

The real-world event notification tool 49 utilizes a policy table that specifies various communication representations that correspond with real-world events. An event interpreter component associates a received indication of a real-world event to at least one of the communication representations. An event notification component notifies the residents that are on-line in the virtual universe of the real-world event in accordance with the representation specified by the policy table. Examples of possible forms of notification include providing residents with a teleport invitation that will bring the residents to a simulacrum of the real-world event within the virtual universe, placing the representation in an inventory of the resident that is associated with the virtual universe, changing the visual characteristics of the resident to a representation that is indicative of the real-world event and changing the visual characteristics of the landscape within the virtual universe to a representation that is indicative of the event.

Below is a more detailed discussion of the real-world event notification tool 49 and how it receives indications of real-world events, transmits the real-world events in a representation that notifies residents that are on-line in the virtual universe 12 of the real-world events.

Figure 4:
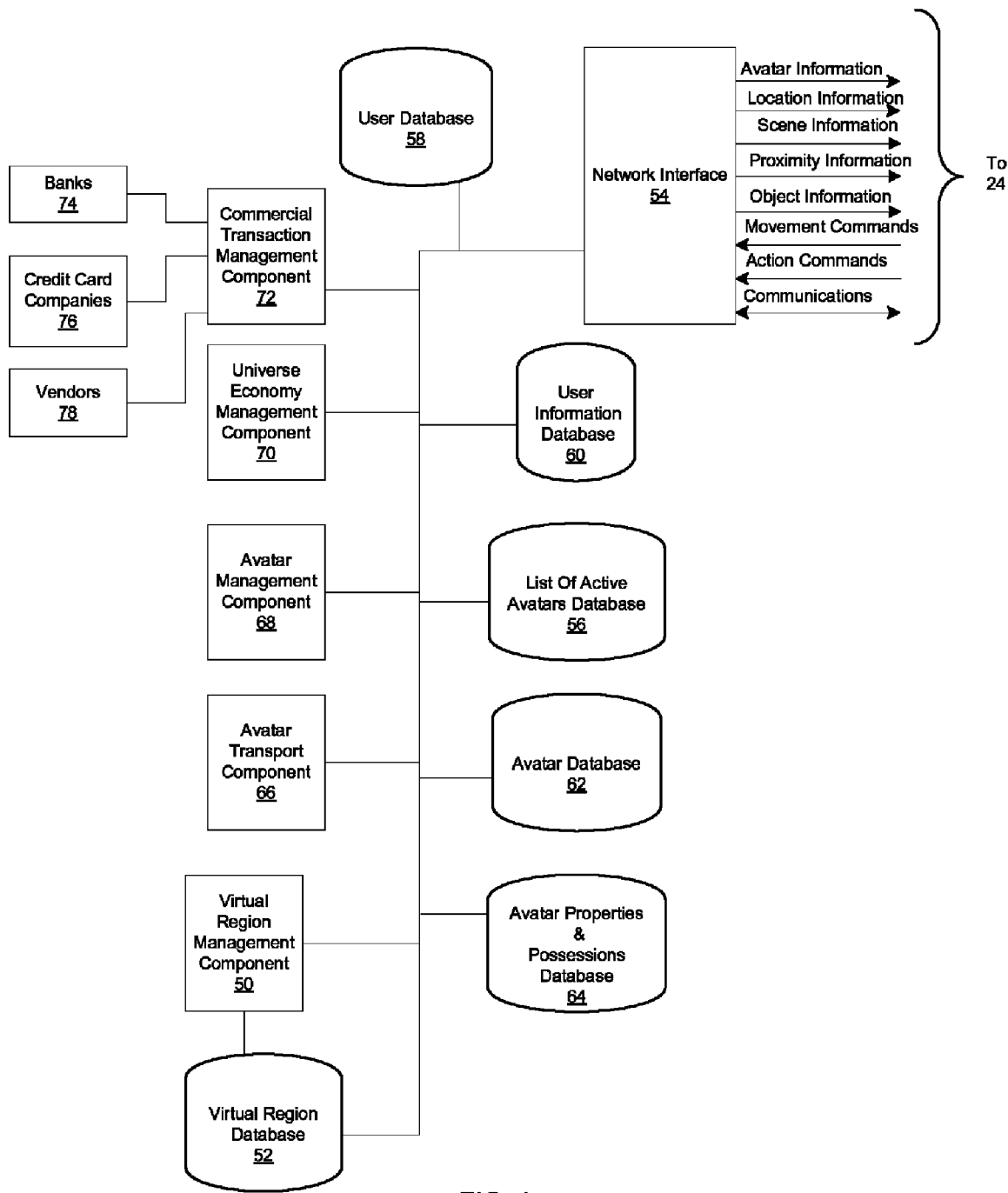
FIG. 4 shows a more detailed view of some the functionalities provided by the server array shown in FIG. 1.

FIG. 4 shows a more detailed view of some the functionalities provided by the server array 14 shown in FIG. 1. In particular, FIG. 4 shows a virtual region management component 50 that manages a virtual region within the virtual universe. In particular, the virtual region management component 50 manages what happens in a particular region such as the type of landscape in that region, the amount of homes, commercial zones, boutiques, streets, parks, restaurants, etc. A virtual region database 52 stores information on all of the items in the virtual region 18 that the virtual region management component 50 is managing. In one embodiment, for very large virtual universes, one server 16 may be responsible for managing one particular virtual region 18 within the universe. In other embodiments, it is possible that one server 16 may be responsible for handling one particular island within the virtual region 18.

FIG. 4 shows a network interface 54 that enables the server array 14 to interact with the virtual universe client residing on computer 20. In particular, the network interface 54 communicates information that includes information pertaining to avatars, location, scene, proximity and objects to the user through the virtual universe client and receives movement and action commands as well as communications from the user via the universe client.

As shown in FIG. 4, there are several different databases for storing information. In particular, database 56 contains a list of all the avatars that are on-line in the virtual universe 12. Databases 58 and 60 contain information on the actual human users (i.e., the residents) of the virtual universe 12. In one embodiment, database 58 contains general information on the users such as names, addresses, interests, ages, etc., while database 60 contains more private information on the users such as email addresses, billing information (e.g., credit card information) for taking part in transactions. Databases 62 and 64 contain information on the avatars of the residents that reside in the virtual universe 12. In one embodiment, database 62 contains information such as all of the avatars that a resident may have, the profile of each avatar, avatar characteristics (e.g., appearance, voice and movement features), while database 64 contains an inventory listing properties and possessions that each avatar owns such as houses, cars, sporting equipment, attire, etc. Those skilled in the art will recognize that databases 58-64 may contain additional information if desired. Although the above information is shown in FIG. 4 as being stored in databases, those skilled in the art will recognize that other means of storing information can be utilized.

An avatar transport component 66 enables individual avatars to transport, which as mentioned above, allows avatars to transport through space from one point to another point, instantaneously. For example, avatars could teleport to an art exhibit held in a museum held in Greenland.

An avatar management component 68 keeps track of what on-line avatars are doing while in the virtual universe. For example, the avatar management component 68 can track where the avatar presently is in the virtual universe, what activities it is performing or has recently performed. An illustrative but non-exhaustive list of activities can include shopping, eating, talking, recreating, etc.

Because a typical virtual universe has a vibrant economy, the server array 14 has functionalities that are configured to manage the economy. In particular, a universe economy management component 70 manages transactions that occur within the virtual universe between avatars. In one embodiment, the virtual universe 12 will have their own currency that users pay for with real-life money. The users can then take part in commercial transactions for their avatars through the universe economy management component 70. In some instances, the user may want to take part in a commercial transaction that benefits him or her and not their avatar. In this case, a commercial transaction management component 72 allows the resident to participate in the transaction. For example, while walking around a commercial zone, an avatar may see a pair of shoes that he or she would like for themselves and not their avatar. In order to fulfill this type of transaction and others similarly related, the commercial transaction management component 72 interacts with banks 74, credit card companies 76 and vendors 78 could be used to facilitate such a transaction.

Although not expressly shown in FIG. 4, all of the components shown in the figure are configured to interact with each other. The components that are shown as being interconnected are illustrated in that manner to convey the close interactions that exist between these components such as the banks 74, credit card companies 76, and vendors 72 with the commercial transaction management component 72.

Figure 5:
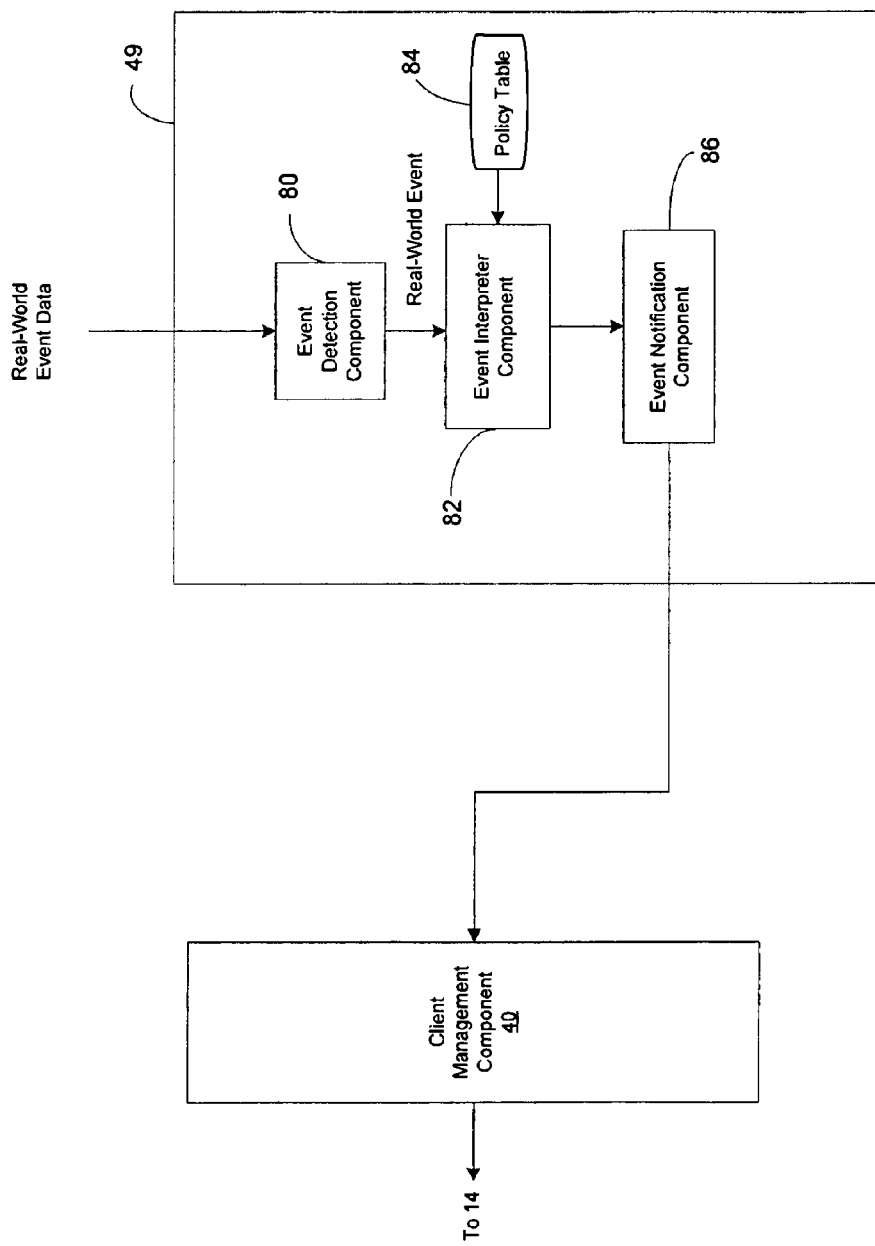
FIG. 5 shows a more detailed view of a real-world event notification tool that can operate within the virtual universe shown in FIG. 1.

FIG. 5 shows a more detailed view of the real-world event notification tool 49 that can operate within the virtual universe shown in FIG. 1. As mentioned above, the real-world event notification tool 49 notifies residents that are on-line in a virtual universe of real-world events. In one embodiment, the real-world event notification tool 49 is an application programming interface (API) that communicates real-world events into the virtual universe client that runs on computer 20 and also communicates directly with the server array 14. In other embodiments, the real-world event notification tool 49 might reside on separate computers in direct communication with the virtual universe servers 16 and universe clients 24A-24N, or components of the tool might reside on both the servers and clients.

The real-world event notification tool 49 comprises an event detection component 80 configured to receive an indication of the occurrence of the real-world event. In one embodiment, the virtual universe client can detect the real-world events by periodically receiving indications of the events through the use of well-known push or pull technologies that can extract such information or through periodic requests made through the client to receive the information. Those skilled in the art will recognize that modifications can be made to the virtual universe client that support push or pull technologies and the capability to make periodic requests of real-world event data. For example, for the push technology, the virtual universe client can be modified to be network aware so that real-world event data is pushed to a listener port on the client. For the pull technology, the client can be modified to pull the data as long as it is pullable (e.g., interrogating log files, calling an API, etc.). The pulling of data embodiment would typically require establishing a network, server, port, proxy, authentication and other settings that are within the purview of a person skilled in the art.

Regardless of what configuration is used the event detection component 80 can obtain real-world events that as mentioned above could include news reports of current events, weather reports, emergency notifications and events occurring at the resident's computer such as processor temperature indications, computer memory usage, central processing unit usage, detection of spyware or viruses, emails, instant messages, reminders, phone calls, etc. Again those skilled in the art will recognize that these examples are non-exhaustive of the many possibilities of real-world events that can be brought to the attention of a resident through the event detection component 80.

In another embodiment, the event detection component 80 is configured to parse the received real-world event data into a form that describes the nature of the real-world event. This embodiment is well suited to parsing extensible markup language (XML) documents. For example, the event detection component 80 can browse a file system associated with the virtual universe client for files to parse, as well as a means to parse regular expressions and various field selections that correspond to the real-world event. This capability would enable a resident to receive an indication of a real-world event and by parsing files in the file system in the client that pertain to the event, information can be extracted that describe the nature of the event and possibly suggest responses or actions to take. In addition to browsing a file system, the event detection component 80 is also configured to interrogate other locally accessible repositories of information such as an operating system registry, event aggregation service or even launching commands that return information. For example, if an antivirus company wished to use the real-world event notification tool 49, then the company could provide a file or signal that describes the nature of the viral problem and preferred ways in which the viral event may be represented in the virtual universe 12.

The real-world event notification tool 49 as shown in FIG. 5 further comprises an event interpreter component 82 configured to determine at least one communication representation from a policy table 84 that specifies a plurality of real-world events and corresponding communication representations for communicating the real-world events to a resident that is on-line in the virtual universe 12. In one embodiment, the policy table 84 is a look-up table that will control how the interpreter component 82 determines which form of representation to use to communicate the real-world event to the resident. For example, a resident or a service provider may specify that when a processor temperature exceeds a critical value, the resident or service technician will receive a teleport invitation such that when the invitation is selected it takes them to a schematic representation or a simulacrum of the processor hardware so that the problem can be better understood.

Another possibility is to put the representation of the overheating processor in the inventory of the resident that is associated with the virtual universe. Other examples of communication representations that the policy table 84 may specify include a change in the visual characteristics of the resident (e.g., a red appearance to indicate an overheating processor) or a change in the visual characteristics of landscape within the virtual universe (e.g., a burning bush to indicate an overheating processor). Those skilled in the art will recognize that these examples of communication representations for a particular real-world event are non-exhaustive of the many possibilities that can be used. For example, one alternative to indicating receipt of an email or instant message is to place a representation of the email or instant message in the hand of resident's avatar.

The policy table 84 can be implemented to work in conjunction with the virtual universe client by making a modification to the client such that it permits the resident to define how to handle notification of matches of representations in the table that associate with the real-world event. Creating visual, text or audio queues associated with the matches will allow the real-world event notification tool 49 to generate the above-noted representations. With respect to communications made to the inventory, those skilled in the art will recognize that this necessitates creating inventory items that can be received and possibly modified upon an event match. For invitations to teleport, those skilled in the art will recognize that this necessitates assigning locations and objects in the virtual universe 12 that when specific events are matched, will teleport the resident to the location and render the objects there if not already rendered.

Although the policy table 84 is shown in FIG. 5 as being located on the virtual universe client, it is within the scope of the invention to store this component in the server 14 or another computer not associated with the server.

In operation, once the event interpreter component 82 receives the indication of the real-world event from the event detection component 80, then the interpreter will examine the policy table 84 to determine at least one communication representation specified in the policy table that corresponds to the real-world event. The event interpreter component 82 will then pass this information to an event notification component 86 which is configured to notify a resident that is on-line in the virtual universe 12 in accordance with the at least one communication representation determined by the interpreter. A non-exhaustive listing of notifications that the event notification component 86 can generate to a resident include a teleport invitation that will bring the resident to a simulacrum of the real-world event within the virtual universe 12, placing the communication representation in an inventory of the resident that is associated with the virtual universe, changing visual characteristics of the resident to a representation that is indicative of the event, and changing visual characteristics of landscape within the virtual universe to a representation that is indicative of the event.

In another embodiment of this invention, the real-world event notification tool 49 is used as a service to charge fees for each notification. In this embodiment, the provider of the virtual universe or a third party service provider could offer this real-world event notification tool 49 as a service by performing the functionalities described herein on a subscription and/or fee basis. In this case, the provider of the virtual universe or the third party service provider can create, deploy, maintain, support, etc., the real-world event notification tool 49 that performs the processes described in the invention. In return, the virtual universe or the third party service provider can receive payment from the virtual universe residents via the universe economy management component 70 and the commercial transaction management component 72.

In still another embodiment, the methodologies disclosed herein can be used within a computer system to notify residents that are on-line in the virtual universe of real-world events. In this case, the real-world event notification tool 49 can be provided and one or more systems for performing the processes described in the invention can be obtained and deployed to a computer infrastructure. To this extent, the deployment can comprise one or more of (1) installing program code on a computing device, such as a computer system, from a computer-readable medium; (2) adding one or more computing devices to the infrastructure; and (3) incorporating and/or modifying one or more existing systems of the infrastructure to enable the infrastructure to perform the process actions of the invention.

Figure 6:
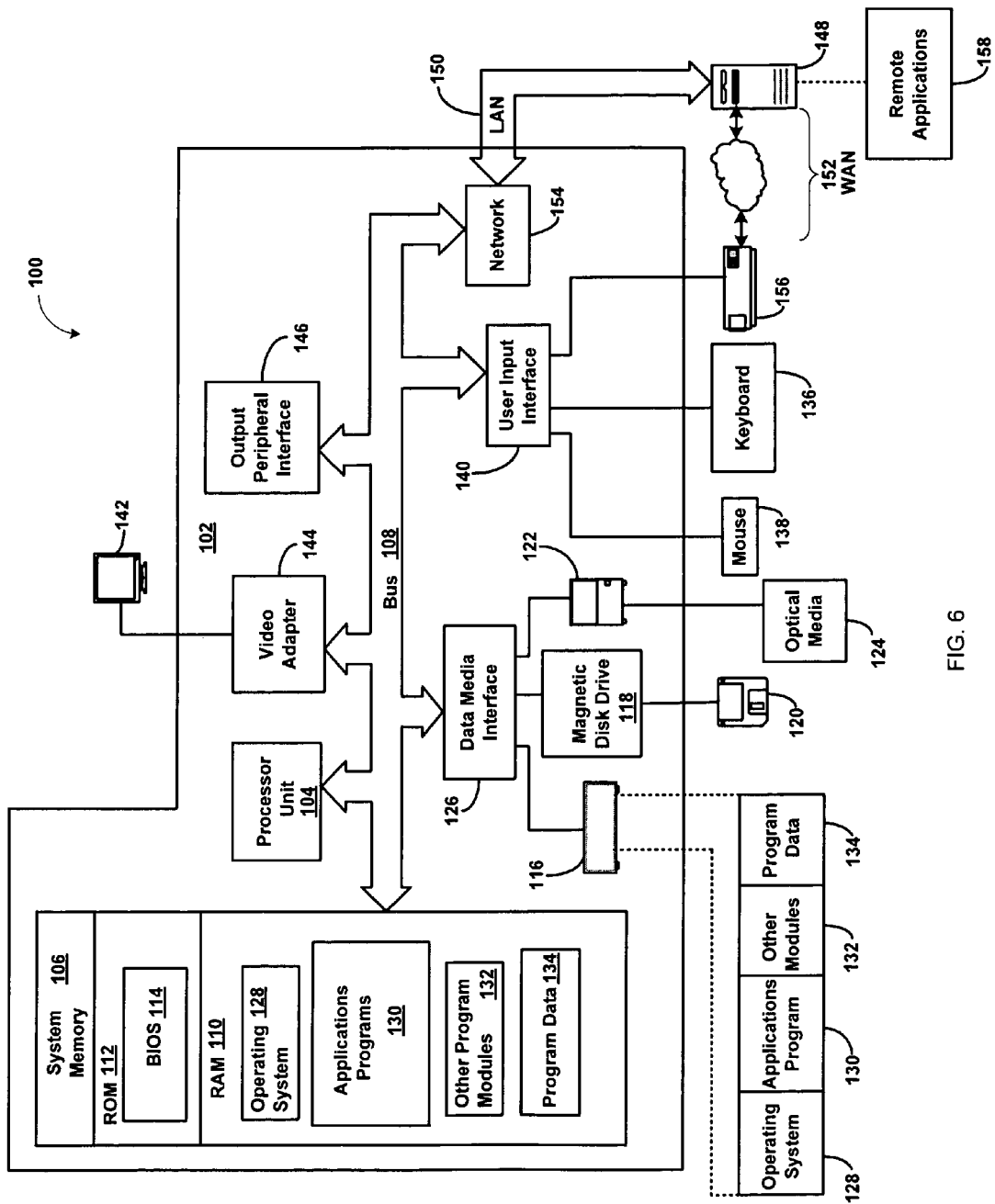
FIG. 6 shows a schematic of an exemplary computing environment in which elements of the networking environment shown in FIG. 1 may operate.

FIG. 6 shows a schematic of an exemplary computing environment in which elements of the networking environment shown in FIG. 1 may operate. The exemplary computing environment 100 is only one example of a suitable computing environment and is not intended to suggest any limitation as to the scope of use or functionality of the approach described herein. Neither should the computing environment 100 be interpreted as having any dependency or requirement relating to any one or combination of components illustrated in FIG. 6.

In the computing environment 100 there is a computer 102 which is operational with numerous other general purpose or special purpose computing system environments or configurations. Examples of well known computing systems, environments, and/or configurations that may be suitable for use with an exemplary computer 102 include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The exemplary computer 102 may be described in the general context of computer-executable instructions, such as program modules, being executed by a computer. Generally, program modules include routines, programs, objects, components, logic, data structures, and so on, that performs particular tasks or implements particular abstract data types. The exemplary computer 102 may be practiced in distributed computing environments where tasks are performed by remote processing devices that are linked through a communications network. In a distributed computing environment, program modules may be located in both local and remote computer storage media including memory storage devices.

As shown in FIG. 6, the computer 102 in the computing environment 100 is shown in the form of a general-purpose computing device. The components of computer 102 may include, but are not limited to, one or more processors or processing units 104, a system memory 106, and a bus 108 that couples various system components including the system memory 106 to the processor 104.

Bus 108 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 102 typically includes a variety of computer readable media. Such media may be any available media that is accessible by computer 102, and it includes both volatile and non-volatile media, removable and non-removable media.

In FIG. 6, the system memory 106 includes computer readable media in the form of volatile memory, such as random access memory (RAM) 110, and/or non-volatile memory, such as ROM 112. A BIOS 114 containing the basic routines that help to transfer information between elements within computer 102, such as during start-up, is stored in ROM 112. RAM 110 typically contains data and/or program modules that are immediately accessible to and/or presently operated on by processor 104.

Computer 102 may further include other removable/non-removable, volatile/non-volatile computer storage media. By way of example only, FIG. 6 illustrates a hard disk drive 116 for reading from and writing to a non-removable, non-volatile magnetic media (not shown and typically called a "hard drive"), a magnetic disk drive 118 for reading from and writing to a removable, non-volatile magnetic disk 120 (e.g., a "floppy disk"), and an optical disk drive 122 for reading from or writing to a removable, non-volatile optical disk 124 such as a CD-ROM, DVD-ROM or other optical media. The hard disk drive 116, magnetic disk drive 118, and optical disk drive 122 are each connected to bus 108 by one or more data media interfaces 126.

The drives and their associated computer-readable media provide nonvolatile storage of computer readable instructions, data structures, program modules, and other data for computer 102. Although the exemplary environment described herein employs a hard disk 116, a removable magnetic disk 118 and a removable optical disk 122, it should be appreciated by those skilled in the art that other types of computer readable media which can store data that is accessible by a computer, such as magnetic cassettes, flash memory cards, digital video disks, RAMs, ROM, and the like, may also be used in the exemplary operating environment.

A number of program modules may be stored on the hard disk 116, magnetic disk 120, optical disk 122, ROM 112, or RAM 110, including, by way of example, and not limitation, an operating system 128, one or more application programs 130, other program modules 132, and program data 134. Each of the operating system 128, one or more application programs 130, other program modules 132, and program data 134 or some combination thereof, may include an implementation of the networking environment 10 of FIG. 1 including the server array 14, the virtual universe client 24 and the real-world event notification tool 49. In one embodiment, the one or more application programs 130 may comprise the various elements of the real-world event notification tool 49 such as the event detection component 80, event interpreter component 82, policy table 84 and event notification component 86.

A user may enter commands and information into computer 102 through optional input devices such as a keyboard 136 and a pointing device 138 (such as a "mouse"). Other input devices (not shown) may include a microphone, joystick, game pad, satellite dish, serial port, scanner, camera, or the like. These and other input devices are connected to the processor unit 104 through a user input interface 140 that is coupled to bus 108, but may be connected by other interface and bus structures, such as a parallel port, game port, or a universal serial bus (USB).

An optional monitor 142 or other type of display device is also connected to bus 108 via an interface, such as a video adapter 144. In addition to the monitor, personal computers typically include other peripheral output devices (not shown), such as speakers and printers, which may be connected through output peripheral interface 146.

Computer 102 may operate in a networked environment using logical connections to one or more remote computers, such as a remote server/computer 148. Remote computer 148 may include many or all of the elements and features described herein relative to computer 102.

Logical connections shown in FIG. 6 are a local area network (LAN) 150 and a general wide area network (WAN) 152. Such networking environments are commonplace in offices, enterprise-wide computer networks, intranets, and the Internet. When used in a LAN networking environment, the computer 102 is connected to LAN 150 via network interface or adapter 154. When used in a WAN networking environment, the computer typically includes a modem 156 or other means for establishing communications over the WAN 152. The modem, which may be internal or external, may be connected to the system bus 108 via the user input interface 140 or other appropriate mechanism.

In a networked environment, program modules depicted relative to the personal computer 102, or portions thereof, may be stored in a remote memory storage device. By way of example, and not limitation, FIG. 6 illustrates remote application programs 158 as residing on a memory device of remote computer 148. It will be appreciated that the network connections shown and described are exemplary and other means of establishing a communications link between the computers may be used.

An implementation of an exemplary computer 102 may be stored on or transmitted across some form of computer readable media. Computer readable media can be any available media that can be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

It is apparent that there has been provided with this invention an approach for notification of a real-world event to a virtual universe user. While the invention has been particularly shown and described in conjunction with a preferred embodiment thereof, it will be appreciated that variations and modifications will occur to those skilled in the art. Therefore, it is to be understood that the appended claims are intended to cover all such modifications and changes as fall within the true spirit of the invention.

What is claimed is:

1. A method for notifying a resident that is on-line in a virtual universe of an occurrence of a real-world event, comprising:
receiving an indication of the occurrence of the real-world event, wherein the real-world event includes a computer-usage event occurring at a computer used by the resident to access the virtual universe, the computer-usage event including computer processor abnormal temperature indications;
parsing real-world event data associated with the occurrence of the real-world event into a form that describes the nature of the real-world event and suggests responses or actions to take in light of the real-world event;
mapping the indication of the real-world event into one of a plurality of communication representations, the plurality of communication representations including a simulacrum of computer processor hardware that upon execution explains any problem associated with the computer-usage event including computer processor abnormal temperature indications, the simulacrum of computer processor hardware is configured to be placed in an inventory of the resident, and a visual color characteristic displayable in the virtual universe to the resident that is representative of the problem affecting the computer processor hardware; and
notifying the resident in the virtual universe in accordance with the mapped communication representation, wherein the notifying comprises placing the mapped communication representation in the inventory of the resident that is associated with the virtual universe, the inventory containing a listing of properties and possessions that are for use in the virtual universe and that belong to the resident, and wherein the notifying comprises providing the resident with a teleport invitation that will bring the resident to the simulacrum of the real-world event within the virtual universe upon acceptance of the teleport invitation, the simulacrum upon execution configured to explain the problem associated with the computer-usage event to the resident in a manner that aids in understanding and solving the problem in relation to the computer process hardware.

2. The method according to claim 1, wherein the mapping comprises applying the indication of the real-world event to a policy table that associates a plurality of real-world events to the plurality of communication representations for communicating the real-world events to a resident.

3. The method according to claim 2, further comprising determining at least one of the communication representations from the policy table that associates with the received real-world event indication.

4. The method according to claim 1, wherein the notifying comprises changing visual characteristics of the resident to a representation that is indicative of the event.

5. The method according to claim 1, wherein the notifying comprises changing visual characteristics of landscape within the virtual universe to a representation that is indicative of the event.

6. The method according to claim 1, further comprising charging a fee to the resident for each notification of a real-world event.

7. A computer system for notifying a resident that is on-line in a virtual universe of a real-world event, comprising:
at least one processing unit;
memory operably associated with the at least one processing unit; and
a real-world event notification tool storable in memory and executable by the at least one processing unit, the tool comprising:
an event detection component configured to receive an indication of the real-world event, wherein the real-world event includes a computer-usage event occurring at a computer used by the resident to access the virtual universe, the computer-usage event including computer processor abnormal temperature indications, wherein the event detection component parses real-world event data associated with the occurrence of the real-world event into a form that describes the nature of the real-world event and suggests responses or actions to take in light of the real-world event;
a policy table that associates a plurality of real-world events to communication representations that are indicative of real-world events, the communication representations including a simulacrum of computer processor hardware that upon execution explains any problem associated with the computer-usage event including computer processor abnormal temperature indications, the simulacrum of computer processor hardware is configured to be placed in an inventory of the resident, and a visual color characteristic displayable in the virtual universe that is representative of the problem affecting the computer processor hardware;
an event interpreter component configured to determine at least one communication representation from the policy table that corresponds with the real-world event indication received by the event detection component; and
an event notification component configured to notify the resident in the virtual universe in accordance with the at least one communication representation determined by the event interpreter component, wherein the event notification component is configured to place the at least one communication representation in the inventory of the resident that is associated with the virtual universe, the inventory containing a listing of properties and possessions that are for use in the virtual universe and that belong to the resident, and wherein the event notification component is configured to provide the resident with a teleport invitation that will bring the resident to the simulacrum of the real-world event within the virtual universe upon acceptance of the teleport invitation, the simulacrum configured to explain the problem associated with the computer-usage event to the resident in a manner that aids in understanding and solving the problem in relation to the computer process hardware.

8. The system according to claim 7, wherein the event detection component is configured to periodically receive indications of real-world events.

9. The system according to claim 7, wherein the event notification component is configured to change visual characteristics of the resident to a representation that is indicative of the event.

10. The system according to claim 7, wherein the event notification component is configured to change visual characteristics of landscape within the virtual universe to a representation that is indicative of the event.

11. A computer-readable storage device storing computer instructions, which when executed, enables a computer system to notify a resident that is on-line in a virtual universe of a real-world event, the computer instructions comprising:
receiving an indication of the real-world event, wherein the real-world event includes a computer-usage event occurring at a computer used by the resident to access the virtual universe, the computer-usage event including computer processor abnormal temperature indications;
parsing real-world event data associated with the occurrence of the real-world event into a form that describes the nature of the real-world event and suggests responses or actions to take in light of the real-world event;
mapping the indication of the real-world event into one of a plurality of communication representations, the plurality of communication representations including a simulacrum of computer processor hardware that upon execution explains any problem associated with the computer-usage event including computer processor abnormal temperature indications, the simulacrum of computer processor hardware is configured to be placed in an inventory of the resident, and a visual color characteristic displayable in the virtual universe to the resident that is representative of the problem affecting the computer processor hardware; and notifying the resident in the virtual universe in accordance with the mapped communication representation, wherein the notifying comprises instructions for placing the mapped communication representation in the inventory of the resident that is associated with the virtual universe, the inventory containing a listing of properties and possessions that are for use in the virtual universe and that belong to the resident, and wherein the notifying comprises instructions for providing the resident with a teleport invitation that will bring the resident to the simulacrum of the real-world event within the virtual universe upon acceptance of the teleport invitation, the simulacrum upon execution configured to explain the problem associated with the computer-usage event to the resident in a manner that aids in understanding and solving the problem in relation to the computer process hardware.

12. The computer-readable storage device according to claim 11, wherein the mapping comprises instructions for applying the indication of the real-world event to a policy table that associates a plurality of real-world events to the plurality of communication representations for communicating the real-world events to a resident.

13. The computer-readable storage device according to claim 12, further comprising instructions for determining at least one of the communication representations from the policy table that associates with the received real-world event indication.

14. The computer-readable storage device according to claim 11, wherein the notifying comprises instructions for changing visual characteristics of the resident to a representation that is indicative of the event.

15. The computer-readable storage device according to claim 11, wherein the notifying comprises instructions for changing visual characteristics of landscape within the virtual universe to a representation that is indicative of the event.

16. The computer-readable storage device according to claim 11, further comprising instructions for charging a fee to the resident for each notification of a real-world event.

17. A method for deploying a real-world event notification tool for use in a computer system that notifies a resident that is on-line in a virtual universe of an occurrence of a real-world event, comprising:

providing a computer infrastructure operable to:

receive an indication of the occurrence of the real-world event, wherein the real-world event includes a computer-usage event occurring at a computer used by the resident to access the virtual universe, the computer-usage event including computer processor abnormal temperature indications;

parse real-world event data associated with the occurrence of the real-world event into a form that describes the nature of the real-world event and suggests responses or actions to take in light of the real-world event;

map the indication of the real-world event into one of a plurality of communication representations, the plurality of communication representations including a simulacrum of computer processor hardware that upon execution explains any problem associated with the computer-usage event including computer processor abnormal temperature indications, the simulacrum of computer processor hardware is configured to be placed in an inventory of the resident, and a visual color characteristic displayable in the virtual universe to the resident that is representative of the problem affecting the computer processor hardware; and notify the resident in the virtual universe in accordance with the mapped communication representation, wherein the notify comprises placing the mapped communication representation in the inventory of the resident that is associated with the virtual universe, the inventory containing a listing of properties and possessions that are for use in the virtual universe and that belong to the resident, and wherein the notify comprises providing the resident with a teleport invitation that will bring the resident to the simulacrum of the real-world event within the virtual universe upon acceptance of the teleport invitation, the simulacrum upon execution configured to explain the problem associated with the computer-usage event to the resident in a manner that aids understanding and solving the problem in relation to the computer process hardware.

18. The method according to claim 17, wherein the computer infrastructure is further operable to charge a fee to the resident for each notification of a real-world event.

* * * * *